US012686443B2

(12) United States Patent

Hammer

(10) Patent No.: US 12,686,443 B2

(45) Date of Patent: Jul. 21, 2026

(54) DETACHABLE UNDERBODY PROTECTION PLATES AND METHODS OF PROVIDING DETACHABLE UNDERBODY PROTECTION PLATES

(71) Applicant: Toyota Motor Engineering & Manufacturing North America, Inc., Plano, TX (US)

(72) Inventor: Jeremiah T. Hammer, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 270 days.

(21) Appl. No.: 18/238,609

(22) Filed: Aug. 28, 2023

(65) Prior Publication Data

US 2025/0074515 A1     Mar. 6, 2025

(51) Int. Cl.
    *B62D 25/20*       (2006.01)

(52) U.S. Cl.
    CPC ................................ *B62D 25/2072* (2013.01)

(58) Field of Classification Search
    CPC .. B60R 13/0861; B62D 21/15; B62D 21/155; B62D 25/2072; B62D 27/06
    USPC .............................................. 296/38, 187.08
    See application file for complete search history.

(56) References Cited

U.S. PATENT DOCUMENTS

| | | | |
|---|---|---|---|
| 10,259,507 B1 | 4/2019 | Johnson et al. | |
| 10,279,764 B1 | 5/2019 | Wymore | |
| 10,787,206 B2 * | 9/2020 | Nagano ................. | B62D 25/20 |
| 2002/0050413 A1 * | 5/2002 | Renault ............... | B62D 21/155 |
| | | | 180/69.1 |
| 2008/0277972 A1 | 11/2008 | Bonofiglio, Jr. | |
| 2016/0052555 A1 * | 2/2016 | Abe ..................... | B60R 13/0861 |
| | | | 296/187.08 |
| 2016/0250914 A1 | 9/2016 | Berryman | |
| 2021/0284247 A1 * | 9/2021 | Dobrozdravic .... | B62D 25/2072 |

FOREIGN PATENT DOCUMENTS

| | | | |
|---|---|---|---|
| CN | 214355902 U | 10/2021 | |
| WO | WO-2014188098 A1 * | 11/2014 | ........... B62D 21/155 |

OTHER PUBLICATIONS

English translation of WO 2014/188098; retrieved via Patent translate located at www.epo.org. (Year: 2025).*

* cited by examiner

*Primary Examiner* — Jason S Daniels
(74) *Attorney, Agent, or Firm* — Dinsmore & Shohl LLP

(57) ABSTRACT

A vehicle includes a protection plate that is releasably mounted to an underside of the vehicle. The protection plate has a slot having a first opening portion and a second opening portion. A bolt extends through the second opening portion and connects to a cross member that extends between longitudinally extending side members of a frame of the vehicle. The second opening portion is sized and configured to allow the bolt to slide out of the second opening portion and toward the first opening portion upon application of a longitudinal force of a preselected amount to release the protection plate from the bolt and at least partially from the underside of the vehicle.

18 Claims, 13 Drawing Sheets

DETACHABLE UNDERBODY PROTECTION PLATES AND METHODS OF PROVIDING DETACHABLE UNDERBODY PROTECTION PLATES

TECHNICAL FIELD

The present specification generally relates to protection plates for vehicles and, and more specifically, underbody protection plates for vehicles that are detachable.

BACKGROUND

Vehicles may be equipped with bumper assemblies and impact protection structures that elastically and plastically deform to absorb energy in the event of an impact. Vehicles may also include various protective features that protect vehicle components from environmental conditions, such as water and salt, and road debris. For example, many vehicles include an undercover that protects a vehicle engine and/or other components from beneath the vehicle. Given the location of many engine compartments at a front of the vehicles, the undercover may also be located at the front of the vehicles. Because the undercovers may be located at the front of the vehicles, the undercovers may have some influence on front impact test results. Accordingly, underbody protection covers are desired that can automatically at least partially detach from the vehicle in the event of a frontal impact.

SUMMARY

In one embodiment, a vehicle includes a protection plate that is releasably mounted to an underside of the vehicle. The protection plate has a slot having a first opening portion and a second opening portion. A bolt extends through the second opening portion and connects to a cross member that extends between longitudinally extending side members of a frame of the vehicle. The second opening portion is sized and configured to allow the bolt to slide out of the second opening portion and toward the first opening portion upon application of a longitudinal force of a preselected amount to release the protection plate from the bolt and at least partially from the underside of the vehicle.

In another embodiment, a protection plate releasably mounts to an underside of a vehicle. The protection plate includes a slot having a first opening portion and a second opening portion. The second portion is sized to receive a bolt through the narrow opening portion and connect to a cross member that extends between longitudinally extending side members of a frame of the vehicle. The second opening portion is sized and configured to allow the bolt to slide out of the second opening portion and toward the first opening portion upon application of a longitudinal force of a preselected amount to release the protection plate from the bolt and at least partially from the underside of the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a protection plate that is releasably mounted to an underside of the vehicle. The protection plate may include a keyhole slot having an enlarged opening portion and a narrow opening portion. A bolt can extend through the narrow opening portion and can connect to a cross member that extends between longitudinally extending side members of a frame of the vehicle. The narrow opening portion is sized and configured to allow the bolt to slide out of the narrow opening portion and into the enlarged opening portion upon application of a longitudinal force of a preselected amount to release the protection plate from the bolt and at least partially from the underside of the vehicle.

Figure 1:
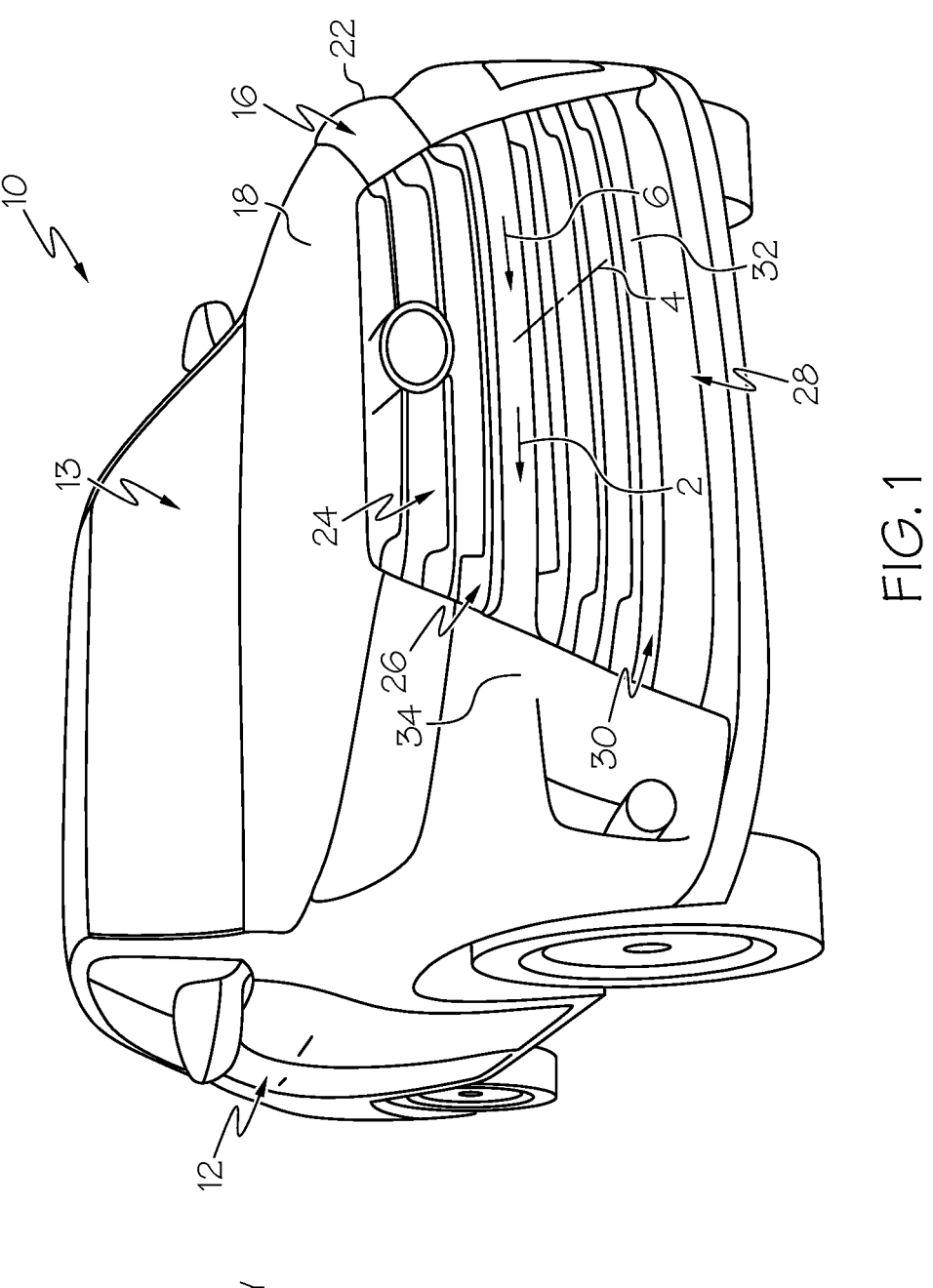
FIG. 1 depicts a perspective view of a vehicle body, according to one or more embodiments shown or described herein.

As used herein, the term "vehicle longitudinal direction" refers to the forward-rearward direction of the vehicle 10 (i.e., in the +/−vehicle X-direction depicted in FIG. 1). The term "vehicle lateral direction" refers to the cross-vehicle direction (i.e., in the +/−vehicle Y-direction depicted in FIG. 1), and is transverse to the vehicle longitudinal direction. The term "vehicle vertical direction" refers to the upward-downward direction of the vehicle 10 (i.e., in the +/−vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline. The term "inboard" or "inward" as used herein refers to the relative location of a component in direction 6 with respect to the vehicle centerline 4. Because the vehicle structures may be generally symmetrical about the vehicle centerline, the direction to which use of terms "inboard," "inward," "outboard" and "outward" refer may be mirrored about the vehicle centerline 4 when evaluating components positioned along opposite sides of the vehicle 10.

Motor vehicles that incorporate elements according to the present disclosure may include a variety of construction methodologies that are conventionally known, including a unibody construction methodology as well as a body-on-frame construction methodology.

Referring initially to FIG. 1, a vehicle 10 is depicted. The vehicle 10 includes a body 12 onto which a vehicle drivetrain is coupled. The vehicle 10 also includes a cabin 13 that is integral with the body 12. The cabin 13 generally defines a passenger cabin of the vehicle 10. The vehicle 10 includes a front end assembly 16 that includes a hood 18, front fenders 20 and 22, an upper grille assembly 24, a front bumper assembly 26 and a lower grille assembly 28 extending between the front fenders 20 and 22. Generally, the upper grille assembly 24 and lower grille assembly 28 include a covering portion 30 with a number of horizontally disposed grille deflectors 32, a mesh or other suitable covering that protects a radiator behind the covering portion 30, while allowing air to flow past the covering and over the radiator. The front end assembly 16 includes an outer covering or front fascia 34 that covers various front components of the vehicle 10.

Figure 2:
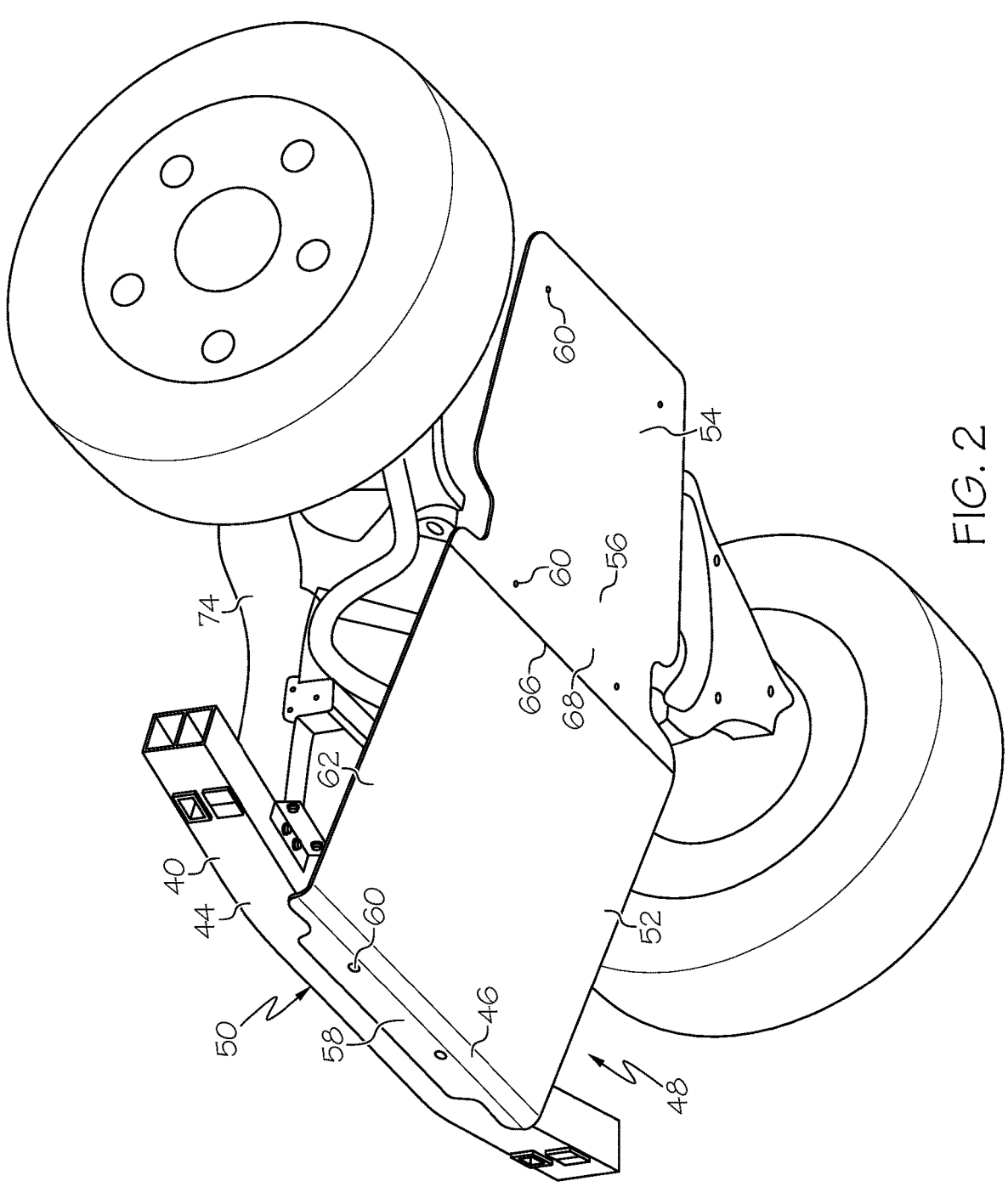
FIG. 2 depicts a perspective of a portion of the vehicle body of FIG. 1 showing a protection plate, according to one or more embodiment shown and described herein.

Referring to FIG. 2, the front fascia 34 (removed in FIG. 2) is an outer cover for covering at least a portion of a bumper reinforcement beam 40 that extends in the vehicle lateral direction between the front fenders 20 and 22 (FIG. 1). The bumper reinforcement beam 40 may generally have a curved shape extending in the vehicle lateral direction and extend forward in the vehicle longitudinal direction to a front face 44. The front fascia 34 can also cover a front edge 46 of a protection plate 48 of an undercover assembly 50. The undercover assembly 50 is located below or closer to the ground than the bumper reinforcement beam 40 and extends rearward in the vehicle longitudinal direction from the front edge 46.

Figure 3:
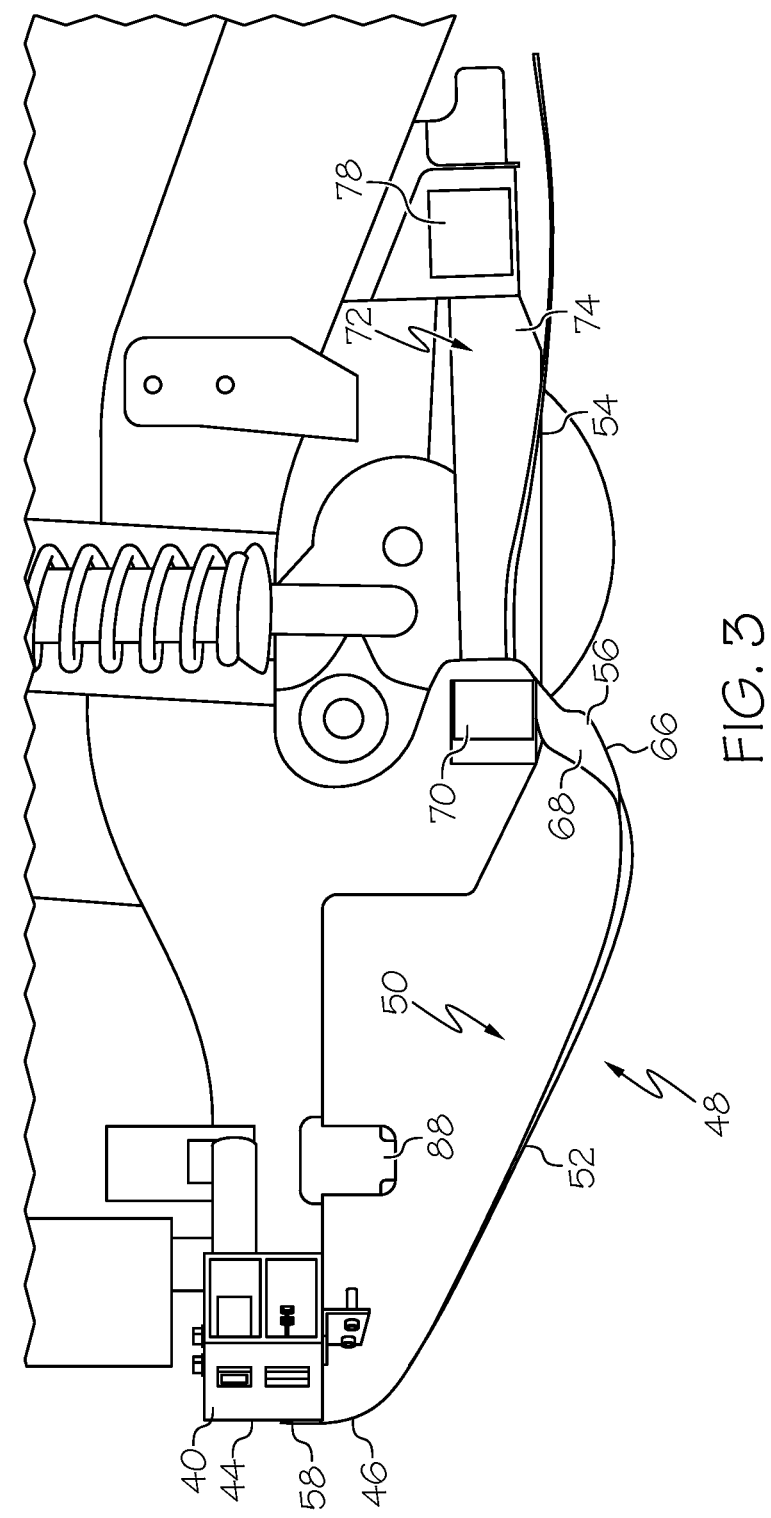
FIG. 3 depicts a side view of the portion of the vehicle body of FIG. 2 showing the protection plate, according to one or more embodiments shown and described herein.

Referring also to FIG. 3, the protection plate 48, sometimes referred to as a skid plate, extends in the vehicle longitudinal and lateral directions underneath the bumper reinforcement beam 40. The protection plate 48 has a length in the vehicle longitudinal direction and a width in the vehicle lateral direction and includes a front portion 52 and a rear portion 54 that are connected together by a connection portion 56 that extends between the front portion 52 and the rear portion 54. As can be seen in FIG. 2, the connection portion 56 has a width in the vehicle lateral direction that is less than the widths of the front portion 52 and the rear portion 54.

Referring still to FIGS. 2 and 3, the front portion 52 may include a vertically turning connecting lip 58 that turns upward and can be connected (e.g., using bolts 60) to the front face 44 of the bumper reinforcement beam 40. In other embodiments, the front portion 52 may not include the connecting lip 58 and may, for example, be connected to a bottom face 62 of the bumper reinforcement beam 40. A floor 64 extends both longitudinally and vertically outward from the connecting lip 58, underhanging an underside of the vehicle 10 thereby providing a shield and added protection for components located above the protection plate 48. Near a rear edge 66 of the front portion 52 is an upturned portion 68 that turns upward toward a cross member 70 (FIG. 3) of frame 72 of the vehicle 10 that extends in the vehicle lateral direction between longitudinally extending side members 74 of the frame 72. This cross member is sometimes referred to as the number one cross member. The protection plate 48 may also include bolts 60 near the rear edge 66 that can be used to mount the front portion 52 to the cross member 70. The rear portion 54 may also be mounted to the frame 72 using bolts 60 at another cross member 78 (FIG. 3), sometimes referred to as the number two cross member. In come embodiments, the front portion 52 may be mounted to still another cross member 88 (FIG. 3), sometimes referred to as the number zero cross member.

Without wishing to be bound by theory, simply bolting the protection plate 48 to one or more of the cross members 70, 78 and/or 88 can affect frontal impact test results and frame 72 buckling patterns. Such an arrangement can transfer forces back to the bumper reinforcement beam 40 at the front of the vehicle 10 causing changes in performance and buckling between structures intended to crush, such as crush boxes, or suspension areas.

To alleviate effects on various areas of the vehicle 10 and improve impact performance, the protection plate 48 may be provided with selected features that aid in providing the vehicle 10 with impact performance an intended baseline with the protection plate 48 in place. For example, referring to FIG. 4, a keyhole slot 100 may be provided having an enlarged opening portion 102 and a narrow opening portion 104. The bolt 60 can extend through the narrow opening portion 104 and can connect to the cross member 70, 78, 88 that extends between longitudinally extending side members 74 and 76 of the frame 72. The narrow opening portion 104 is sized and configured to allow the bolt 60 to slide out of the narrow opening portion 104 and toward the enlarged opening portion 102 upon application of a longitudinal force of a preselected amount to release the protection plate 48 from the bolt 60 and at least partially from the underside of the vehicle 10.

Figure 4:
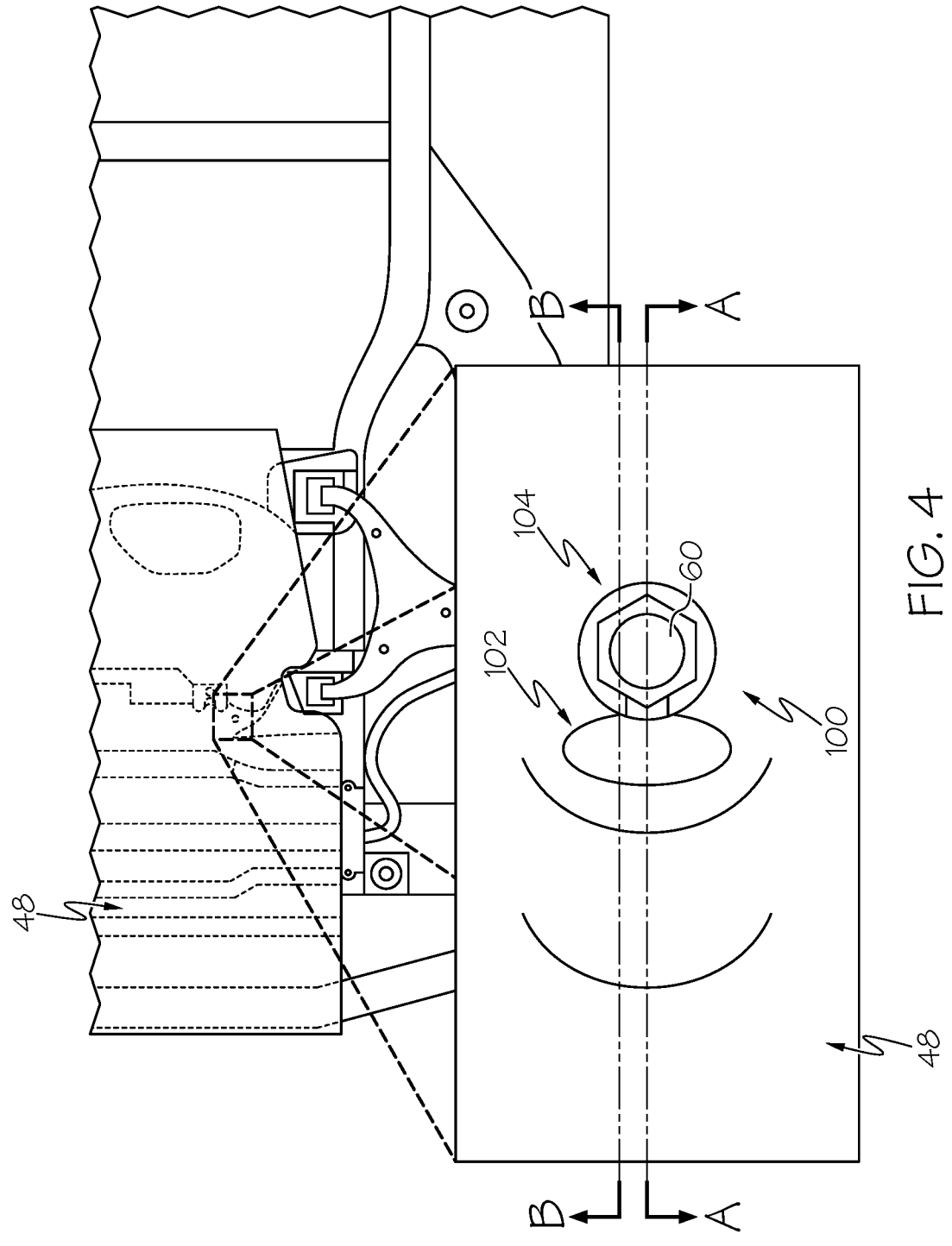
FIG. 4 depicts a bottom view of the portion of the vehicle body of FIG. 3 showing a portion of the protection plate and a detail view of a keyhole slot, according to one or more embodiments shown and described herein.
Figure 5A:
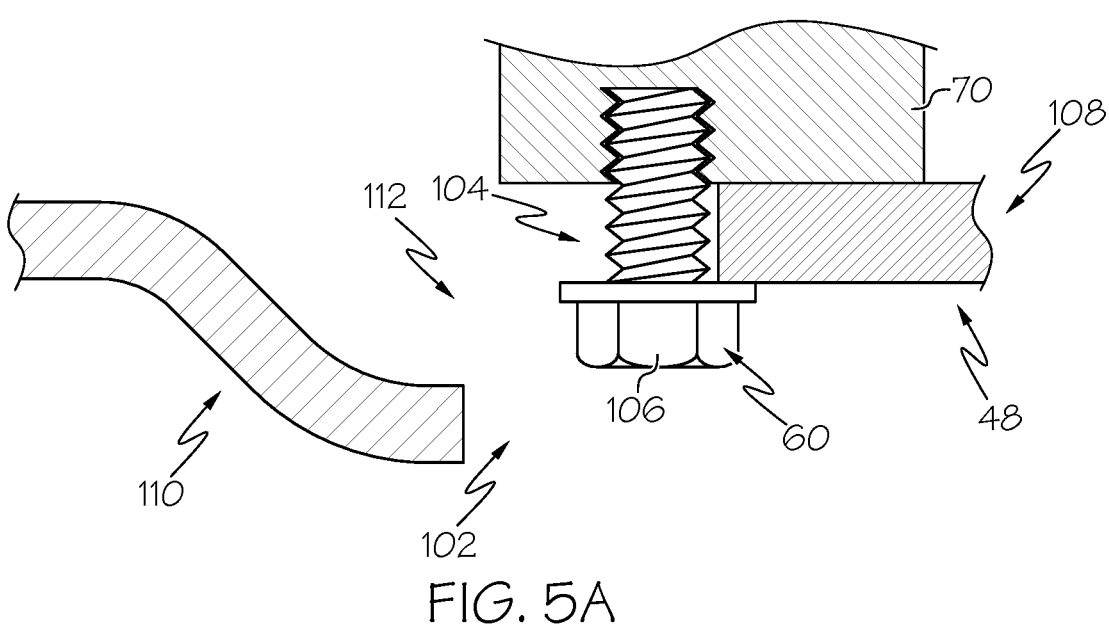
FIG. 5A depicts a side section view along line A-A of FIG. 4.
Figure 5B:
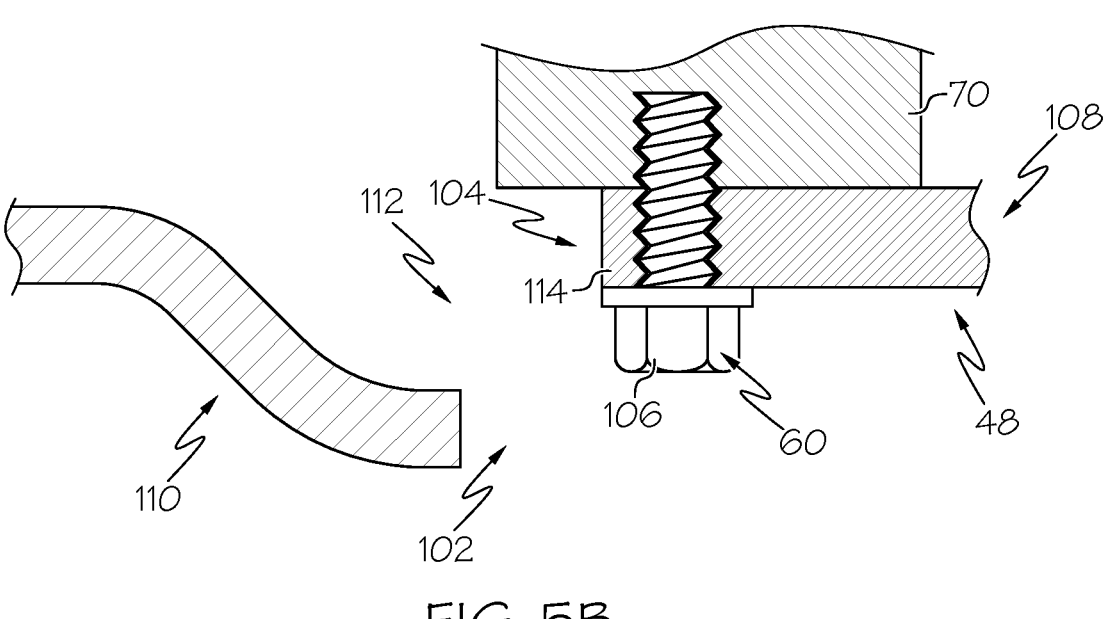
FIG. 5B depicts a side section view along line B-B of FIG. 4.

FIGS. 5A and 5B illustrate section views along lines A-A and B-B of FIG. 4 such that FIG. 5A represents a section view through a more central longitudinal line through the bolt 60 and FIG. 5B represents a section view through a more outer edge longitudinal line through the bolt 60. As can be seen, a head 106 of the bolt 60 may capture the protection plate 48 between the head 106 and the cross member 70, providing some resistance to movement of the protection plate 48 relative to the cross members 70, 78, 88. Due to the upturned portion 68, a rear part 108 of the upturned portion 68 is located higher than a front part 110 of the upturned portion 68. Such an arrangement can provide a vertical gap 112 between the narrow opening portion 104 and the enlarged opening portion 102 providing clearance for the head 106 to move out of the keyhole slot 100 due to application of a frontal force. As will be described in greater detail below, the keyhole slot 100 may be formed with an overlap portion 114 (FIG. 5B) where the material of the protection plate 48 extends partially in front of the bolt 60. This overlap portion 114 can provide some controllable resistance against the bolt 60 sliding out of the narrow opening portion 104 and out of the keyhole slot 100.

It should be noted that, in some embodiments including the vertical gap 112 between the narrow opening portion 104 and the enlarged opening portion 102, the enlarged opening portion 102 may not be needed in order to release the bolt 60 from the protection plate 48. In this regard, a slot of any suitable dimensions may be used to receive and then release the bolt 60.

Figures 6A, 6B:
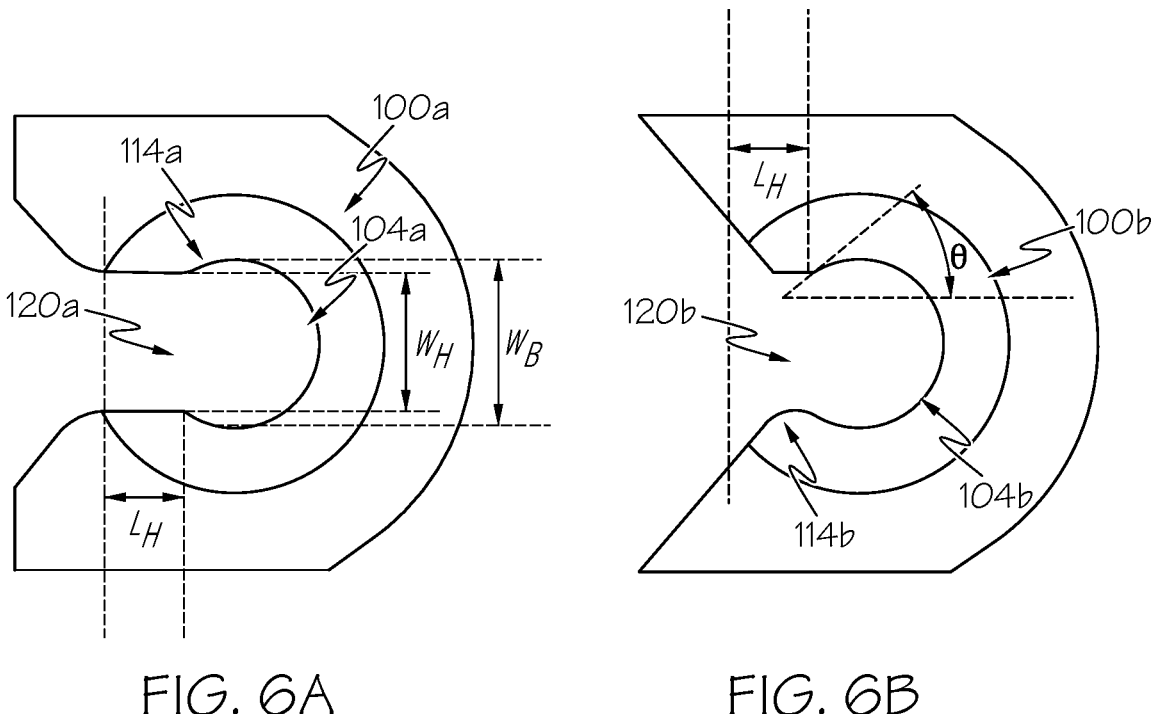
FIG. 6A depicts a top view of a narrow opening portion of a keyhole slot, according to one or more embodiments shown and described herein.
FIG. 6B depicts a top view of another narrow opening portion of a keyhole slot having an increased amount of overlap portion compared to FIG. 6A, according to one or more embodiments shown and described herein.
Figure 7:
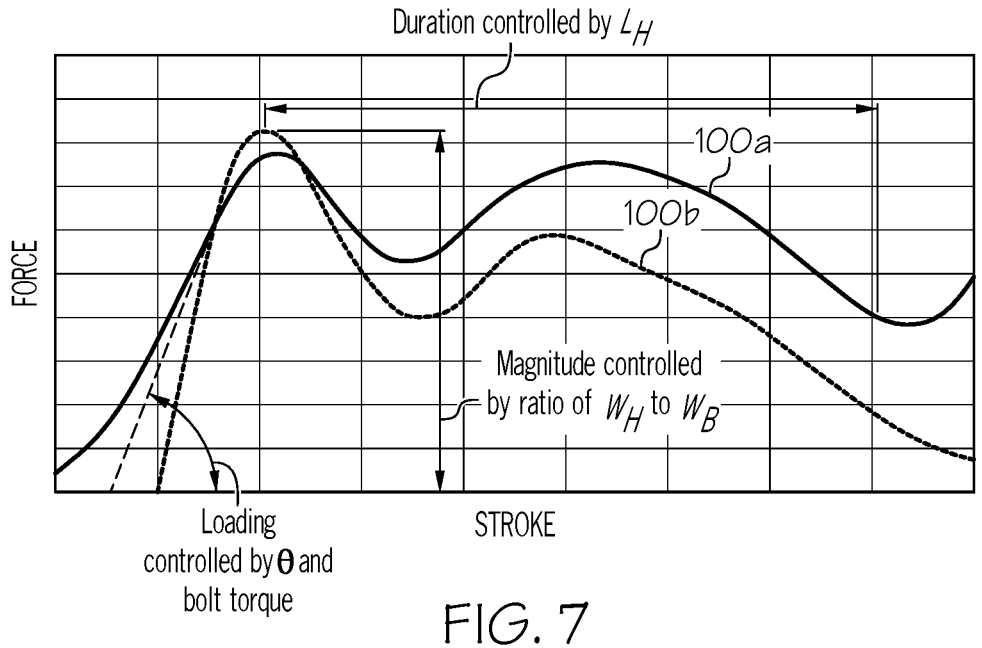
FIG. 7 depicts an illustrative chart showing the effects of the dimensions and shape of the narrow opening portion of the keyhole slot on release of a protection plate, according to one or more embodiments shown and described herein.
Figure 8A:
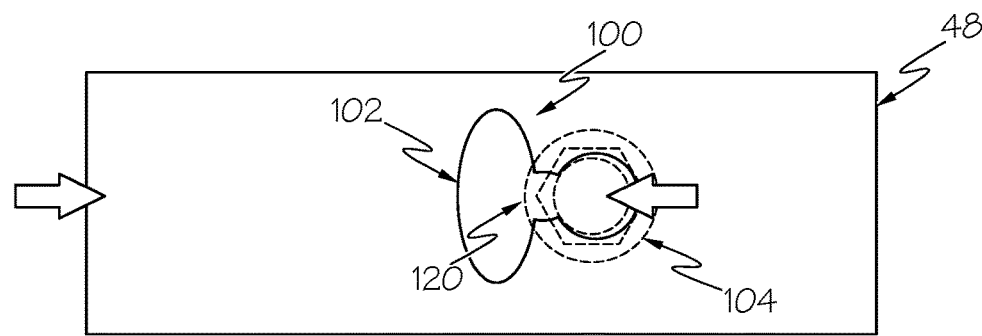
FIG. 8 depicts operation of a keyhole slot and movement of the keyhole slot relative to a bolt during a frontal impact event, according to one or more embodiments shown and described herein.
Figure 8B:
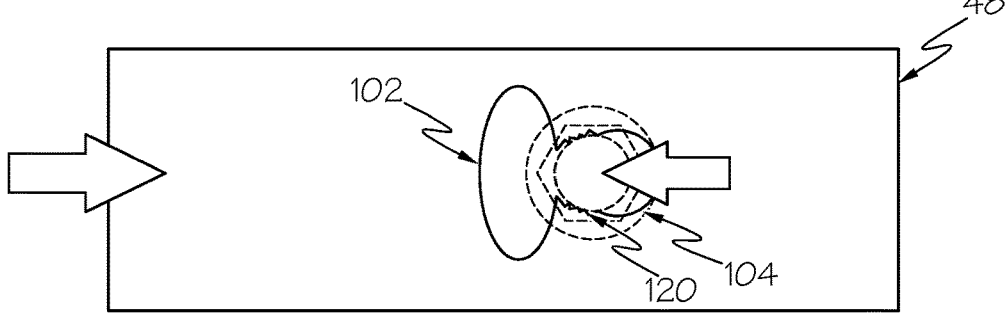
Figure 8C:
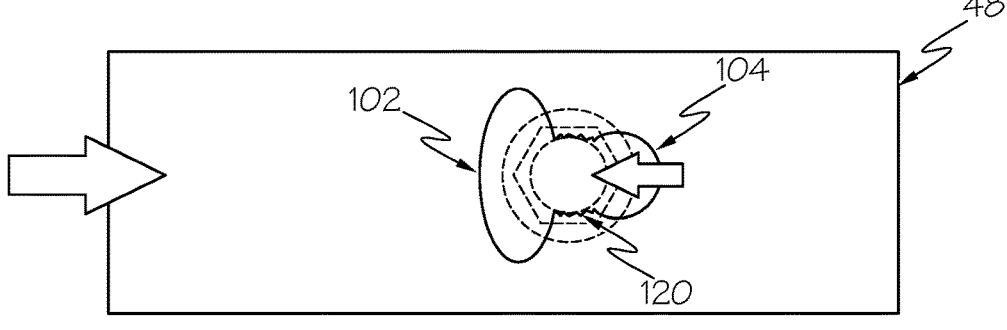
Figure 8D:
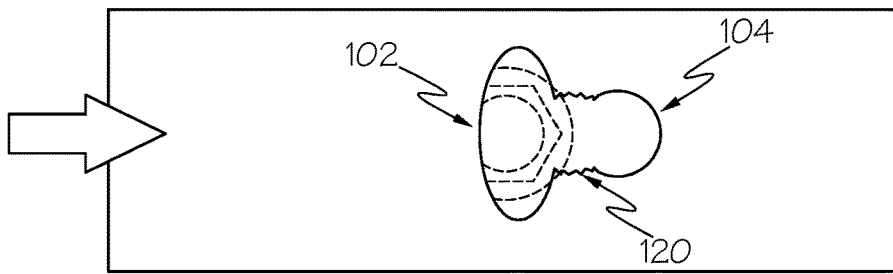

FIGS. 6A and 6B illustrate two examples showing different amounts of the overlap portion 114a and 114b at a doorway portion 120a and 120b of the narrow opening portion 104a, 104b of the keyhole slot 100a and 100b that provide exit openings to the enlarged opening portion. Referring also to FIG. 7, the loading that is necessary to achieve movement of the protection plate 48 relative to the bolt 60 is controlled by the exit angle θ of the overlap portions 114a and 114b and the amount of bolt torque, i.e., how hard the bolt 60 is tightened against the protection plate 48. The magnitude of force necessary to move the bolt into the doorway portion 120a and 120b is controlled by the ratio of $W_H$ to $W_B$, or the width of the doorway portion 120a, 120b to the diameter or maximum width of the narrow opening portion 104a, 104b. The duration of the stroke out of the doorway portion 120a, 120b is controlled by $L_H$, the length of the doorway portion 120a, 120b.

FIG. 7 shows two examples that correspond to the keyhole slots 100a and 100b. Referring also to FIGS. 8A-8D showing operation of the keyhole slot 100, the keyhole slot 100a requires less force to move the bolt 60 into the doorway portion 120a than the doorway portion 120b as the exit angle θ of the narrow opening portion 104a is reduced relative to the narrow opening portion 104b of the keyhole slot 100b. The ratio of $W_H$ to $W_B$ of the narrow opening portion 104a is smaller than the ratio of $W_H$ to $W_B$ of the narrow opening portion 104b, which results in a lower magnitude of force to place the bolt 60 in the doorway portion 120a compared to doorway portion 120b. Lastly, because the length $L_H$ of the doorway portion 120a is longer than doorway portion 120b, the stroke duration of the doorway portion 120a is longer than doorway portion 120b.

Figure 9:
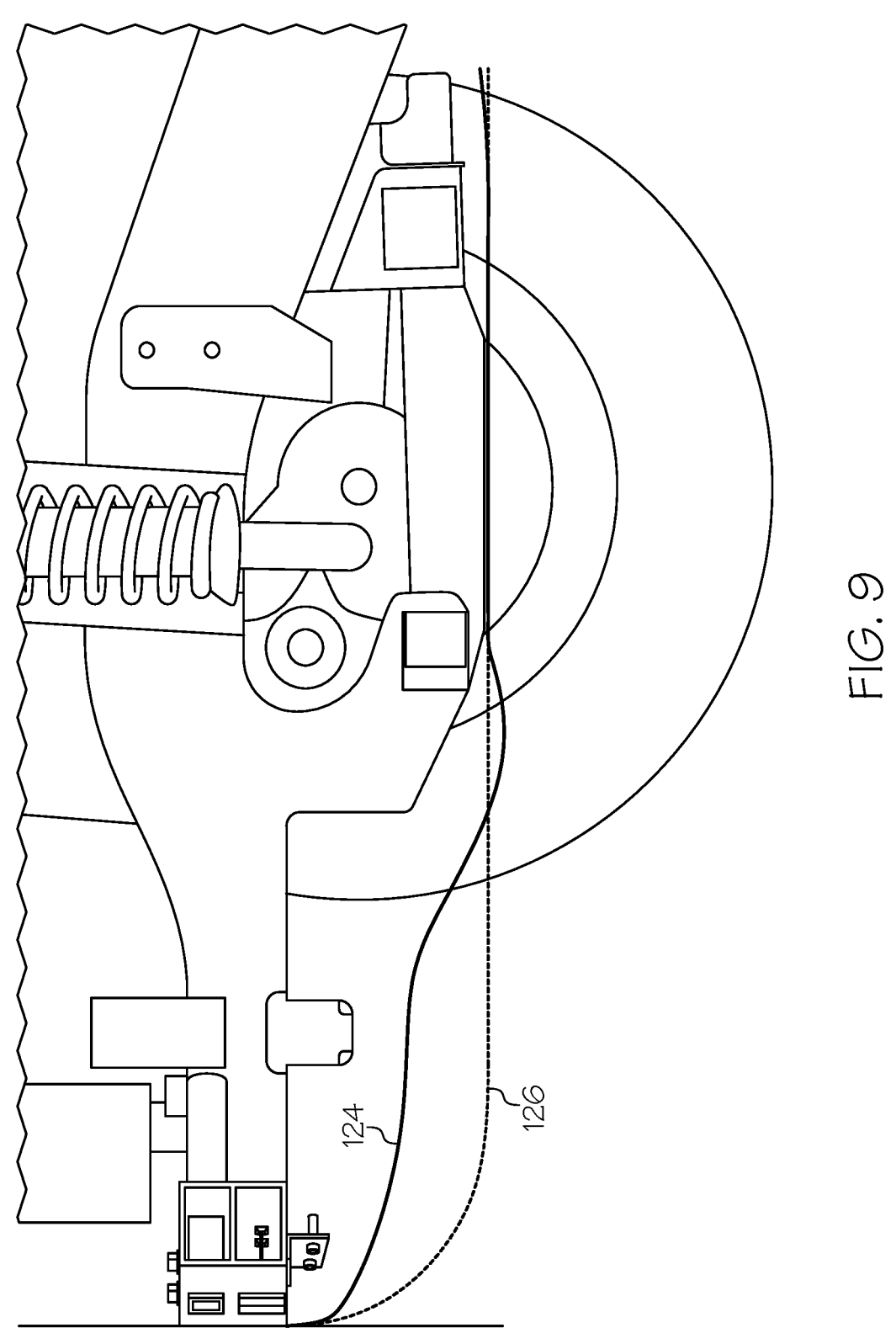
FIG. 9 depicts a side view of a portion of a vehicle illustrating buckling patterns, according to one or more embodiments shown and described herein.

Turning to controlling bend patterns of the protection plate, referring briefly to FIG. 9, shown in solid line is a non-ideal example of a protection plate without impact enhancing features described herein. With no impact performance enhancing features, a protection plate can generate several bend points, which can provide non-idea loading to the frame of the vehicle as more load is transferred in this scenario. A protection plate 126 with a single controllable bend, shown by the dashed line, can be controllably provided, which can provide a more ideal scenario where less load is transferred to the frame.

Figure 10:
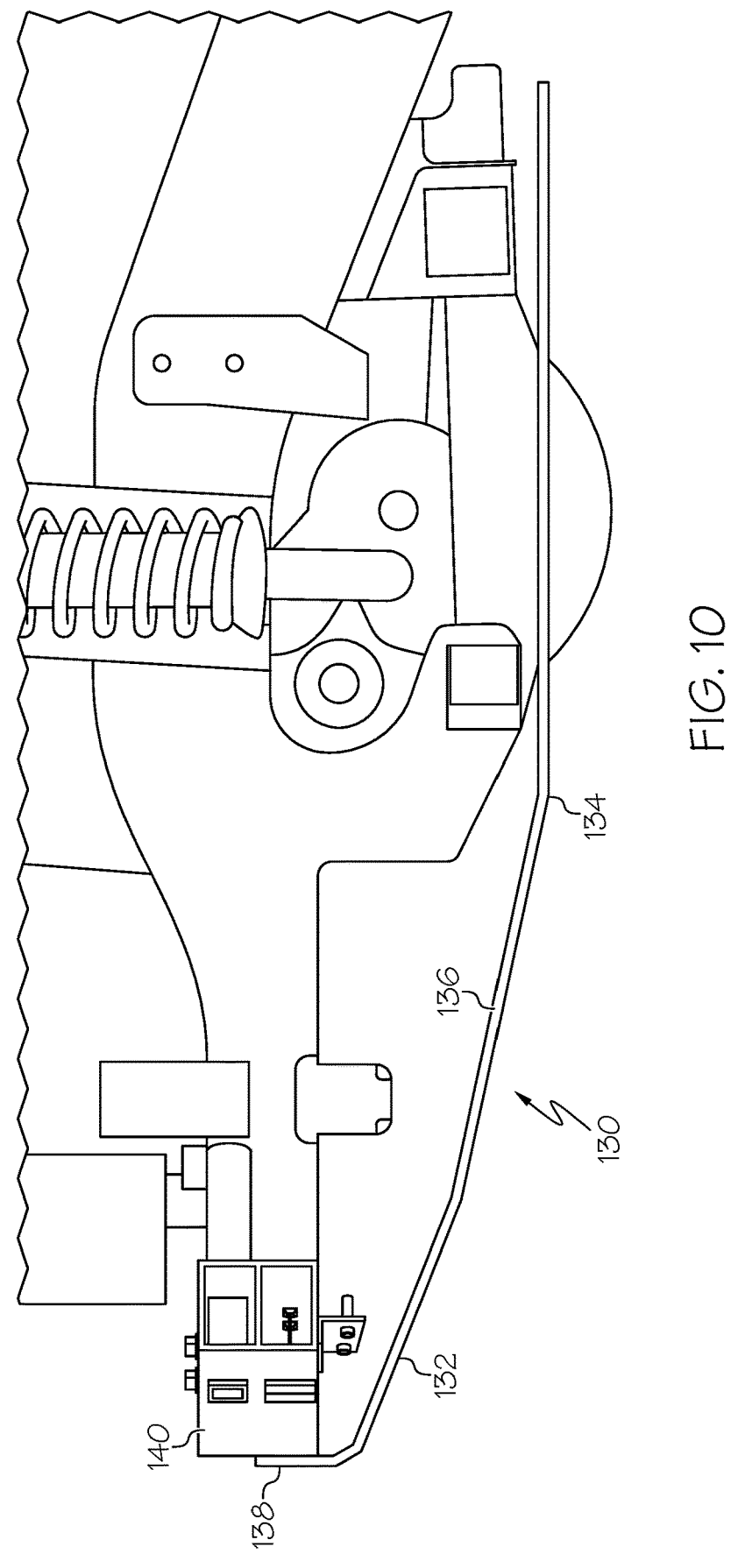
FIG. 10 depicts a side view of a portion of a vehicle including a protection plate with one or more bends, according to one or more embodiments shown and described herein.

Referring to FIG. 10, an example of a protection plate 130 includes a one or more bends 132 and 134 in a front portion 136 that extends downward an longitudinally from a connecting lip 138 mounted to a bumper reinforcement beam 140. The bends 132 and 134 can provide stress concentration lines when an impact force is provided along which the protection plate 130 tends to bend downward.

Figure 11:
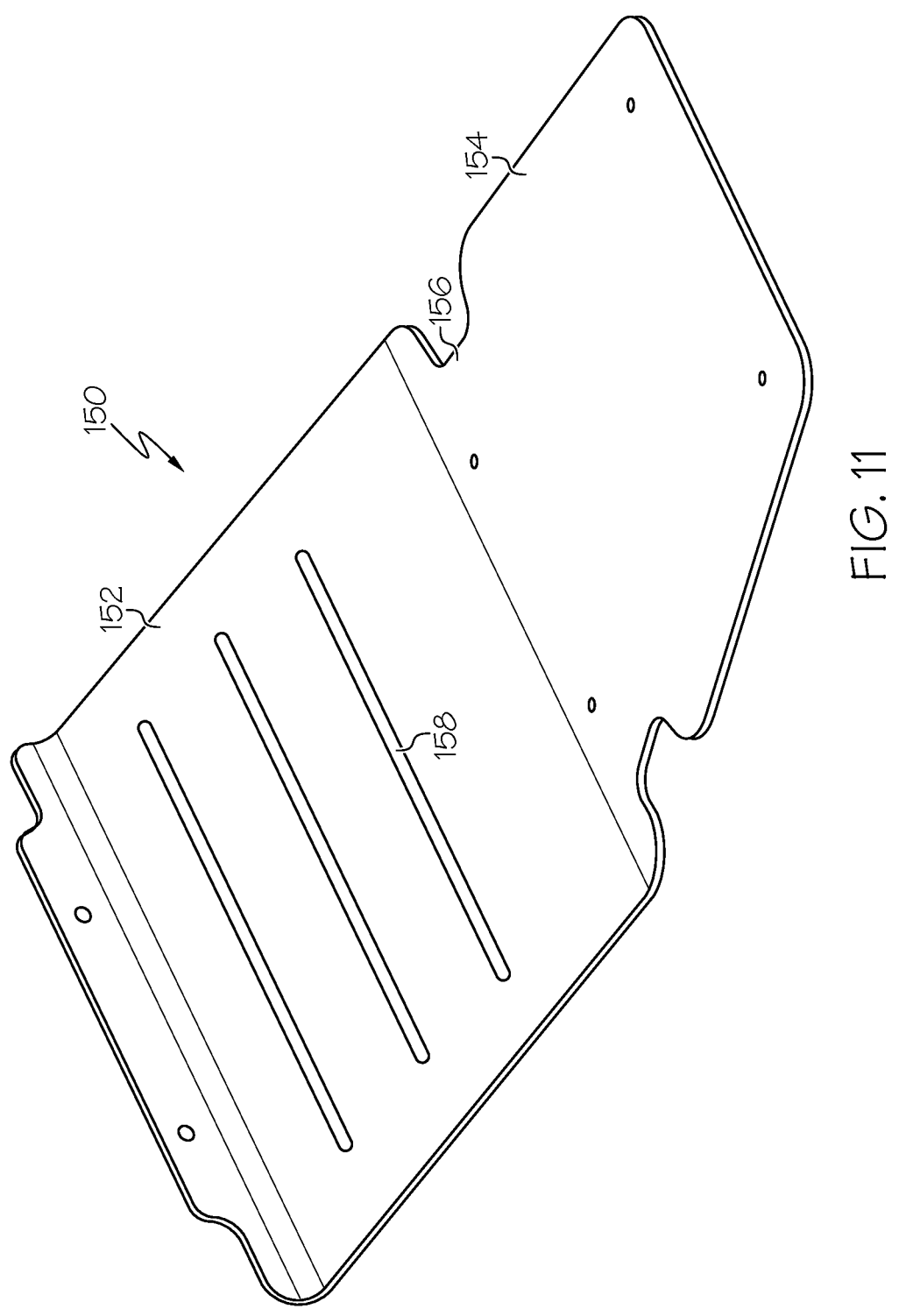
FIG. 11 depicts a perspective view of a protection plate including recesses, according to one or more embodiments shown and described herein.

Referring to FIG. 11, in another embodiment, a protection plate 150 includes a front portion 152, a rear portion 154 and a connecting portion 156 in a fashion similar to that described above. The front portion 152 includes one or more recessed regions 158 that have an elongated dimension that extends in the vehicle lateral direction. The recessed regions 158 provide regions of reduced plate thickness (e.g., one millimeter or more, such as two millimeters or more, such as three millimeters or more, etc.) that can provide stress concentration lines when an impact force is provided along which the protection plate 150 tends to bend downward.

Figure 12:
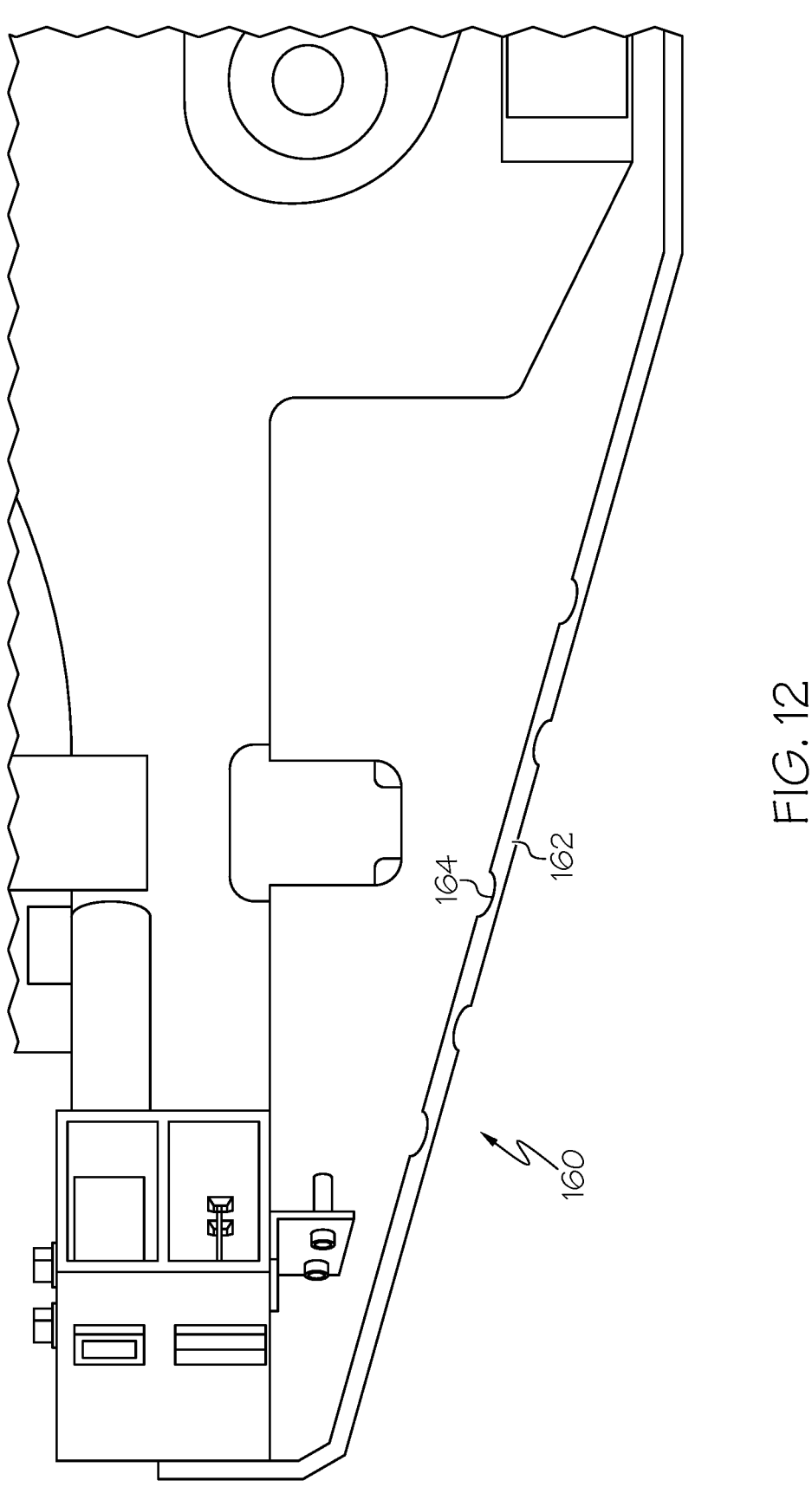
FIG. 12 depicts a side view of a protection plate with recesses on opposite sides, according to one or more embodiments shown and described herein.
Figure 13:
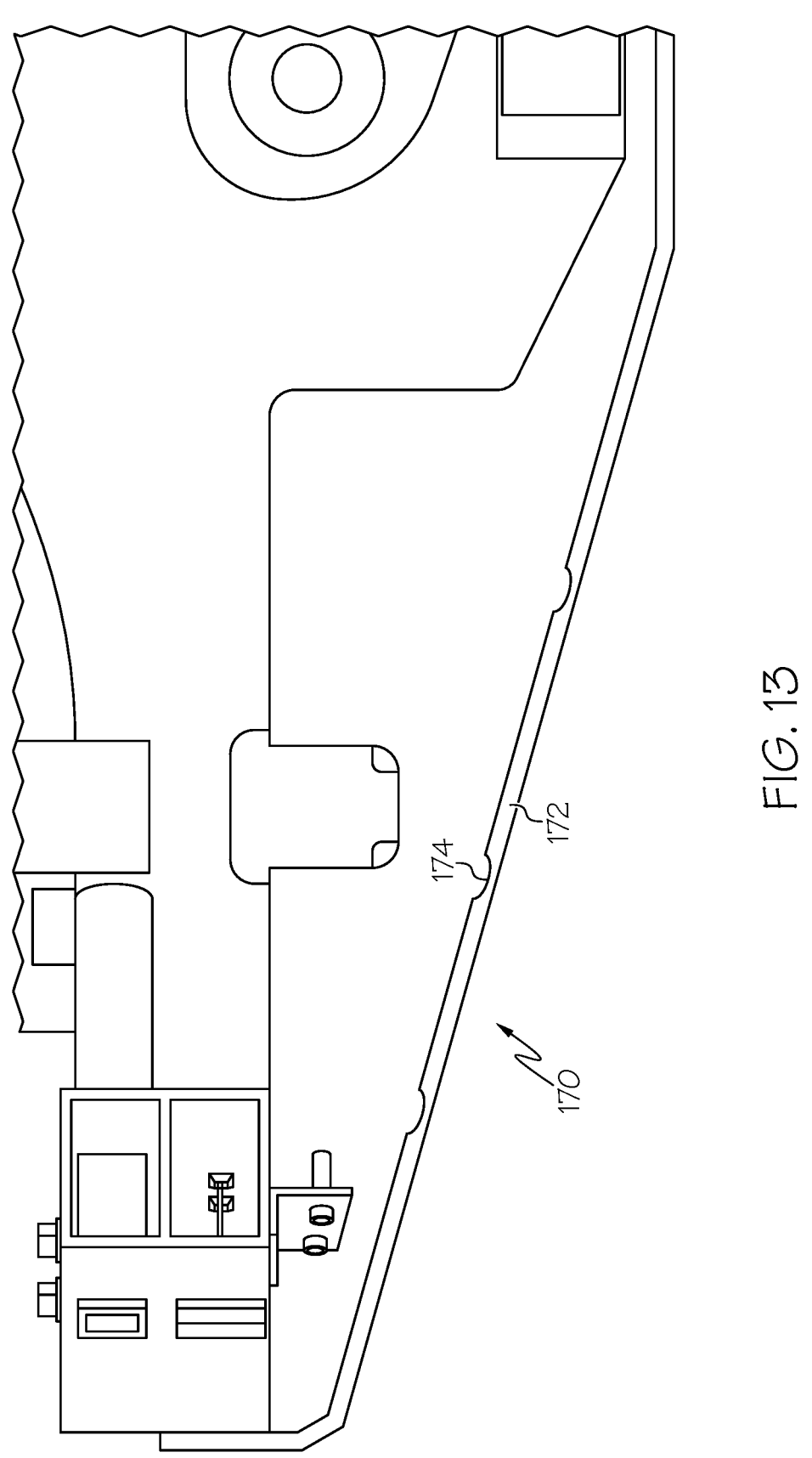
FIG. 13 depicts a side view of a protection plate with recesses on one side, according to one or more embodiments shown and described herein.

In the embodiment of FIG. 11, the recessed regions 158 extend only partially along a width of the protection plate 150 in the vehicle lateral direction. Referring to FIG. 12, a protection plate 160 includes a front portion 162 that includes recessed regions 164 that extend an entire width of the protection plate in the vehicle lateral direction. The recessed regions may be located on opposite faces of the protection plate 150 providing stress concentration lines. FIG. 13, illustrates an embodiment of a protection plate 170 that includes a front portion 172 with recessed regions 174 on one side of the protection plate 170 facing the vehicle.

Figure 14:
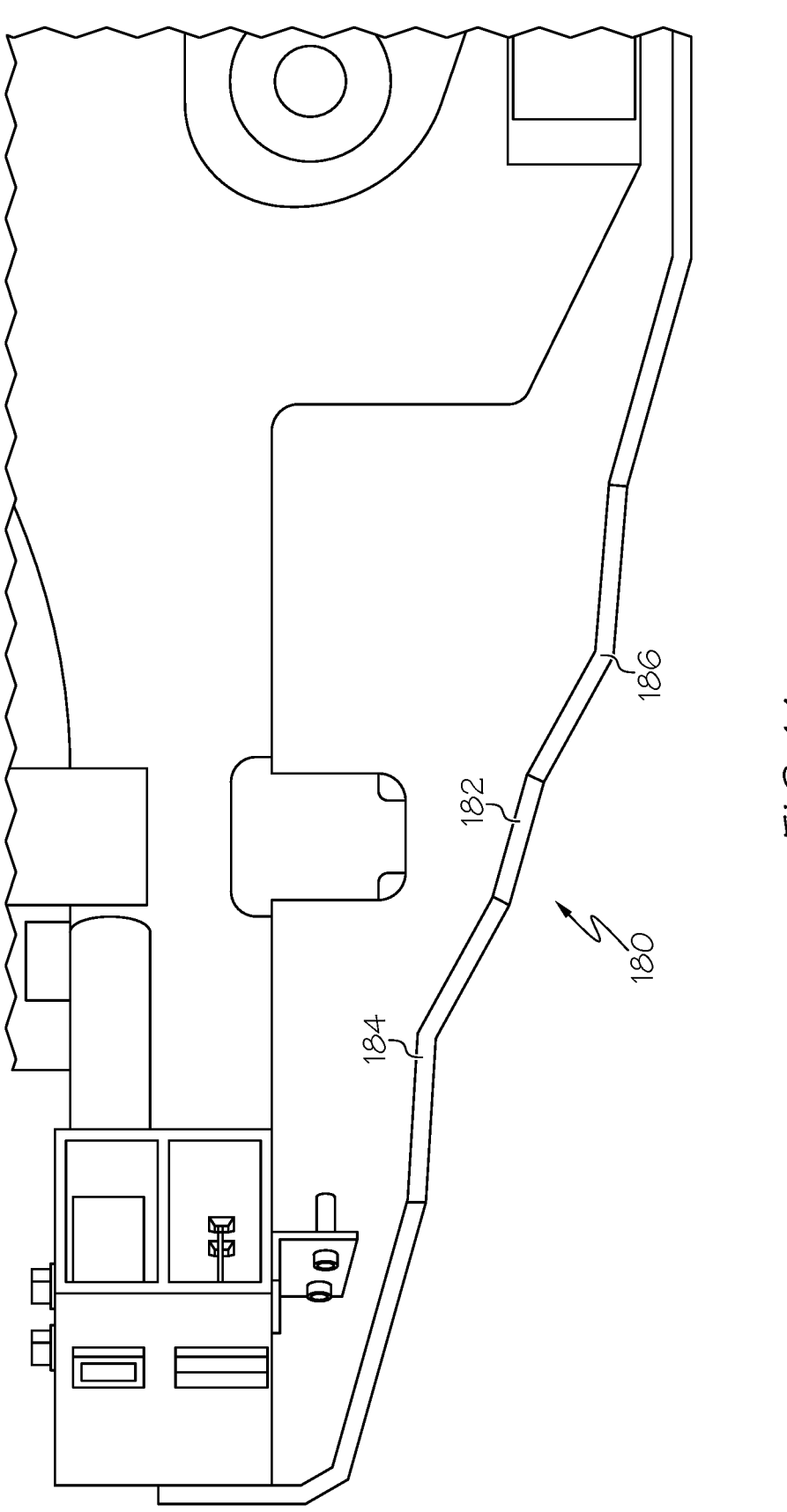
FIG. 14 depicts a side view of a protection plate with bends in opposite directions, according to one or more embodiments shown and described herein.

Referring to FIG. 14, in some embodiments, a protection plate 180 includes a front portion 182 with multiple bends 184 and 186. The bend 184, for example, is bent upward toward the vehicle and the bend 186 is bend in an opposite direction away from the vehicle. The bends 184 and 186 may provide stress concentration lines along which the protection plate can more easily bend due to an impact force.

It should be noted that any of the impact performance enhancement features described above, such as the keyhole slots and bending features, can be used in any combination together. For example, a single protection plate may include any of keyhole slots, bent regions, recessed regions, etc. described above. The protection plates may be formed of any suitable materials, such as aluminum, steel, and composite materials.

The above-described protection plates are bolted to a frame of a vehicle and cover and protect an underbody of the vehicle. Such an arrangement may be desired when off roading, for example, to protect against rocks and other debris. The protection plates can be designed to separate at a given load from the frame during a frontal impact event and reduce the protection plate side effects compared to if the protection plates remained in place, mounted to the frame. Allowing the bolts to slip off the protection plates to release from the frame can allow for little to no change to the areas of the vehicle intended to crush, such as the crush box area, reduce the forces transferred between the cross members and the bumper reinforcement beam and facilitate crushing in the suspension area. Other impact performing enhancements may be provided, such as bends and recessed regions of reduced thickness that facilitate buckling patterns and buckling timing.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a protection plate that is releasably mounted to an underside of the vehicle, the protection plate having a slot having a first opening portion and a second opening portion, wherein the protection plate comprises a vertically turning connecting lip at a front edge of the protection plate, the connecting lip mounted to a front face of a bumper reinforcement beam; and
a bolt extends through the second opening portion and connects to a cross member that extends between longitudinally extending side members of a frame of the vehicle, the second opening portion is sized and configured to allow the bolt to slide out of the second opening portion and toward the first opening portion upon application of a longitudinal force of a preselected amount to release the protection plate from the bolt and at least partially from the underside of the vehicle.

2. The vehicle of claim 1, wherein the protection plate includes a front portion and a rear portion that are connected together by a connecting portion, the connecting portion having a reduced width compared to the front and rear portions.

3. The vehicle of claim 1, wherein the protection plate includes a front portion, a rear portion and an upturned portion between the front portion and the rear portion, the upturned portion extends upward toward the cross member.

4. The vehicle of claim 3, wherein the slot is located at the upturned portion such that the second opening portion of the slot is offset vertically from the first opening portion.

5. The vehicle of claim 1, wherein the slot is a keyhole slot and the first and second opening portions are enlarged and narrow opening portions, respectively, the narrow opening portion has a doorway portion that provides an exit opening between the narrow opening portion and the enlarged opening portion of the keyhole slot, wherein the doorway portion includes an overlap portion that extends partially in front of the bolt.

6. The vehicle of claim 1, wherein the cross member is a number one cross member, number two cross member or number three cross member.

7. The vehicle of claim 1, wherein a front portion of the protection plate is mounted to a bottom facing surface of a bumper reinforcement beam.

8. The vehicle of claim 1, wherein the slot is a keyhole slot and the first and second opening portions are enlarged and narrow opening portions, respectively, the protection plate comprises multiple keyhole slots having enlarged opening portions and narrow opening portions.

9. The vehicle of claim 1, wherein the protection plate comprises one or more bends that provide lines extending in a vehicle lateral direction.

10. The vehicle of claim 1, wherein the protection plate comprises one or more recessed regions of reduced material thickness having an elongated dimension that extends in a vehicle lateral direction.

11. A protection plate that releasably mounts to an underside of a vehicle, the protection plate comprising:
a slot having a first opening portion and a second opening portion;
wherein the second portion is sized to receive a bolt through the second opening portion and connect to a cross member that extends between longitudinally extending side members of a frame of the vehicle, the second opening portion is sized and configured to allow the bolt to slide out of the second opening portion and toward the first opening portion upon application of a longitudinal force of a preselected amount to release the protection plate from the bolt and at least partially from the underside of the vehicle;
wherein the protection plate comprises a vertically turning connecting lip at a front edge of the protection plate, the connecting lip configured to mount to a front face of a bumper reinforcement beam.

12. The protection plate of claim 11, wherein the protection plate includes a front portion and a rear portion that are connected together by a connecting portion, the connecting portion having a reduced width compared to the front and rear portions.

13. The protection plate of claim 11, wherein the protection plate includes a front portion, a rear portion and an upturned portion between the front portion and the rear portion, the upturned portion configured to extend upward toward the cross member with the protection plate mounted to the underside of the vehicle.

14. The protection plate of claim 13, wherein the slot is located at the upturned portion such that the second opening portion of the keyhole slot is offset vertically from the first opening portion with the protection plate mounted to the underside of the vehicle.

15. The protection plate of claim 11, wherein the slot is a keyhole slot and the first and second opening portions are enlarged and narrow opening portions, respectively, the narrow opening portion has a doorway portion that provides an exit opening between the narrow opening portion and the enlarged opening portion of the keyhole slot, wherein the doorway portion includes an overlap portion that extends partially in front of the bolt with the protection plate mounted to the underside of the vehicle.

16. The protection plate of claim 11, wherein a front portion of the protection plate is configured to mount to a bottom facing surface of a bumper reinforcement beam.

17. The protection plate of claim 11, wherein the slot is a keyhole slot and the first and second opening portions are enlarged and narrow opening portions, respectively, the protection plate comprises multiple keyhole slots having enlarged opening portions and narrow opening portions.

18. The protection plate of claim 11, wherein the protection plate comprises one or more bends that provide lines extending in a vehicle lateral direction and/or one or more recessed regions of reduced material thickness having an elongated dimension that extends in the vehicle lateral direction.

* * * * *